(12) United States Patent
Canler et al.

(10) Patent No.: US 8,985,042 B2
(45) Date of Patent: Mar. 24, 2015

(54) WATERTIGHTNESS BARRIER FOR A WALL OF A TANK

(75) Inventors: Gery Canler, La Celle les Bordes (FR); Amaury Mange, Montigny le Bretonneux (FR)

(73) Assignee: Gaztransport et Technigaz, Saint Remy les Chevreuse (FR)

( * ) Notice: Subject to any disclaimer, the term of this patent is extended or adjusted under 35 U.S.C. 154(b) by 141 days.

(21) Appl. No.: 13/990,956

(22) PCT Filed: Oct. 21, 2011

(86) PCT No.: PCT/FR2011/052470
§ 371 (c)(1),
(2), (4) Date: May 31, 2013

(87) PCT Pub. No.: WO2012/072906
PCT Pub. Date: Jun. 7, 2012

(65) Prior Publication Data
US 2013/0255562 A1    Oct. 3, 2013

(30) Foreign Application Priority Data

Dec. 1, 2010 (FR) ..................................... 10 59952

(51) Int. Cl.
*F17C 3/04* (2006.01)
*F17C 3/02* (2006.01)
(Continued)

(52) U.S. Cl.
CPC . *F17C 3/04* (2013.01); *F17C 3/027* (2013.01); *F17C 2201/0157* (2013.01); *F17C 2201/052* (2013.01); *F17C 2203/0304* (2013.01); *F17C 2203/0631* (2013.01);
(Continued)

(58) Field of Classification Search
CPC ............................... B63B 35/285; B63B 25/16
USPC ......................................... 114/74 A; 220/560
See application file for complete search history.

(56) References Cited

U.S. PATENT DOCUMENTS 3,777,107 A * 12/1973 Jean et al. ........................ 219/82
3,785,320 A * 1/1974 Bourgeois et al. .......... 114/74 A
(Continued)

FOREIGN PATENT DOCUMENTS

| FR | 2140716 A5 | 1/1973 |
| FR | 2172837 A2 | 10/1973 |

(Continued)

*Primary Examiner* — Lars A Olson
*Assistant Examiner* — Jovon Hayes
(74) *Attorney, Agent, or Firm* — Birch, Stewart, Kolasch & Birch, LLP

(57) ABSTRACT

A method of creating a watertightness barrier for a wall of a watertightened thermally insulating tank, involves steps of: arranging a repeating structure including alternately a strip of sheet metal and an elongate welding flange connected to the support surface, so that the turned-up lateral edges of the strip of sheet metal are positioned against the adjacent welding flanges, welding the turned-up lateral edge to the welding flange using a straight welded seam along a first longitudinal portion, continuing the straight welded seam with an end portion which is deviated in the direction of an upper edge corner, and producing a watertight edge corner welded seam along a second longitudinal portion of the strip of sheet metal such that the edge corner welded seam watertightly meets the end portion of the welded seam.

20 Claims, 5 Drawing Sheets

(51) Int. Cl.
*B23K 9/00* (2006.01)
*B23K 31/02* (2006.01)
*B63B 25/16* (2006.01)
*F17C 9/00* (2006.01)
*F17C 13/08* (2006.01)

(52) U.S. Cl.
CPC ............ *F17C 2203/0651* (2013.01); *F17C 2205/0355* (2013.01); *F17C 2209/221* (2013.01); *F17C 2209/232* (2013.01); *F17C 2221/033* (2013.01); *F17C 2223/0161* (2013.01); *F17C 2223/033* (2013.01); *F17C 2260/011* (2013.01); *F17C 2260/013* (2013.01); *F17C 2270/0107* (2013.01); *F17C 2270/0118* (2013.01); *F17C 2270/0136* (2013.01); *B23K 9/00* (2013.01); *B23K 31/02* (2013.01); *B63B 25/16* (2013.01); *F17C 9/00* (2013.01); *F17C 13/082* (2013.01); *F17C 2205/0192* (2013.01); *F17C 2201/054* (2013.01); *F17C 2203/0358* (2013.01); *F17C 2205/0119* (2013.01); *F17C 2205/0364* (2013.01); *F17C 2223/013* (2013.01); *F17C 2225/013* (2013.01); *F17C 2225/0161* (2013.01); *F17C 2225/033* (2013.01); *F17C 2227/0135* (2013.01); *F17C 2260/016* (2013.01); *F17C 2260/033* (2013.01); *F17C 2265/05* (2013.01); *F17C 2265/061* (2013.01); *F17C 2265/063* (2013.01)
USPC .... 114/74 A; 114/74 T; 114/74 R; 220/560.1; 220/560.12; 220/560.07

(56) References Cited

U.S. PATENT DOCUMENTS

| | | | | |
|---|---|---|---|---|
| 4,065,019 | A | * | 12/1977 | Letourneur et al. ...... 220/560.07 |
| 4,225,054 | A | * | 9/1980 | Jean ........................... 220/592.2 |
| 4,747,513 | A | * | 5/1988 | Betille et al. ............. 220/560.12 |
| 5,269,247 | A | * | 12/1993 | Jean ............................ 114/74 A |
| 5,447,112 | A | * | 9/1995 | Jean ............................ 114/74 A |
| 5,450,806 | A | * | 9/1995 | Jean ............................ 114/74 A |
| 5,586,513 | A | * | 12/1996 | Jean et al. .................... 114/74 A |
| 6,035,795 | A | * | 3/2000 | Dhellemmes et al. ...... 114/74 A |
| 6,374,761 | B1 | * | 4/2002 | Dhellemmes ............... 114/74 A |
| 6,584,781 | B2 | * | 7/2003 | Bishop et al. .................. 62/54.1 |
| 7,464,658 | B2 | * | 12/2008 | Dhellemmes et al. ...... 114/74 A |
| 7,555,991 | B2 | * | 7/2009 | Dhellemmes et al. ...... 114/74 A |
| 7,819,273 | B2 | * | 10/2010 | Yang et al. ................ 220/592.26 |
| 7,934,353 | B2 | * | 5/2011 | Dhellemmes et al. ........ 52/783.1 |
| 7,938,287 | B2 | * | 5/2011 | Yang et al. ............... 220/560.07 |
| 8,020,721 | B2 | * | 9/2011 | Skovholt et al. ........... 220/560.1 |
| 8,317,056 | B2 | * | 11/2012 | Lee et al. .................. 220/560.12 |
| 8,444,803 | B2 | * | 5/2013 | Gomart ......................... 156/295 |
| 2013/0255562 | A1 | * | 10/2013 | Canler et al. ................ 114/74 A |

FOREIGN PATENT DOCUMENTS

| | | | |
|---|---|---|---|
| FR | 2398961 | A1 | 2/1979 |
| FR | 2549575 | A1 | 1/1985 |
| FR | 2709725 | A1 | 3/1995 |
| FR | 2724623 | A1 | 3/1996 |
| FR | 2798358 | A1 | 3/2001 |

* cited by examiner

WATERTIGHTNESS BARRIER FOR A WALL OF A TANK

The invention relates to the field of watertightened thermally insulating tanks, notably for storing or transporting hot or cold liquids and in particular to tanks for low-temperature liquefied gases.

FR-A-2798358, FR-A-2709725, FR-A-2549575 or FR-A-2398961 for example disclose storage or transport tanks for low-temperature liquefied gases, in which the or each watertightness barrier, notably a primary watertightness barrier in contact with the product contained in the tank, consists of thin sheet metal plates joined together in a watertight manner by turned-up edges that define bellows that can be deformed on each side of a welding flange.

In order to create watertight welded seams joining sheet metal plates with turned-up edges to the welding flanges over long lengths it is possible to use electric welding machines, for example as described in FR-A-2172837 or FR-A-2140716. Such a welding machine, which is relatively heavy, travels along the welding line while being held pressed against the sheet metal plates, the turned-up edges of which it is welding together. This holding is achieved by inclining the axis of the machine drive rolls towards the front of the machine in its direction of travel. The welding machine is thus able to weld along all the walls of the tank, even the vertical walls and the roof, while remaining constantly and firmly pressed against the layer of sheet metal plate, the turned-up edges of which it is welding together.

In a tank of the abovementioned type, there are regions in which the progress of the welding machine that is creating the welded seams between the turned-up edges of the sheet metal plates and the welding flange has to be interrupted, for example at the end of a wall near a corner of the tank. There then arises the problem of ensuring the continuity of the metal membrane in such a region, in the knowledge that the watertightness barrier may be subjected to high tensile stresses resulting, where appropriate, from thermal contraction, deformation of the bearing structure at sea and/or movements of the cargo at sea such as sloshing.

According to one embodiment, the invention provides a method of creating a watertightness barrier for a wall of a watertight thermally insulating tank, notably a bottom wall of the tank, comprising:

arranging, on a thermally insulating barrier that has a flat support surface for the watertightness barrier, a repeating structure comprising alternately a strip of sheet metal and an elongate welding flange connected to the support surface so that the welding flange runs parallel to the strip of sheet metal over at least part of the length of the strip of sheet metal and so that turned-up lateral edges of the strip of sheet metal are positioned against the adjacent welding flanges, watertightly welding the turned-up lateral edge to the welding flange using a straight welded seam parallel to the support surface along a first longitudinal portion of the strip of sheet metal, continuing the straight welded seam with an end portion of the welded seam which is deviated in the direction of an upper edge corner of the turned-up lateral edge and which meets the upper edge corner of the turned-up lateral edge, producing a watertight edge corner welded seam between the upper edge corner of the turned-up lateral edge of the strip of sheet metal and the upper edge corner of the turned-up lateral edge of an adjacent strip of sheet metal along a second longitudinal portion of the strip of sheet metal so that the edge corner welded seam watertightly meets the end portion of the welded seam.

Embodiments of this method may comprise one or more of the following features.

According to one embodiment, the straight welded seam is produced using a welding machine moving along resting on the two adjacent strips of sheet metal along the turned-up lateral edges, the welding machine having rotary electrode wheels and drive rolls capable of gripping the turned-up lateral edges, the drive rolls having their axes inclined towards the front of the machine in its direction of travel with respect to the direction perpendicular to the strips of sheet metal.

According to one embodiment, the end portion of the welded seam is produced by deviating the path of the welding machine in the direction of the upper edge corner of the turned-up lateral edges.

According to one embodiment, the welding machine is run along an inclined plane positioned on the strips of sheet metal in order to deviate its path in the direction of the upper edge corner of the turned-up lateral edges.

According to one embodiment, the end portion of the welded seam is produced by deviating a welding member with respect to a frame of the welding machine in the direction of the upper edge corner of the turned-up lateral edges. To do that, use is made of a welding machine in which the welding torch is mounted such that it can move with respect to the frame of the machine, for example on a pivot, the axis of which runs transversally to the direction of travel of the machine or on a slide perpendicular to the wall of the tank. Such an embodiment of the method allows the deviated end portion to be produced without disconnecting the machine from the turned-up edges of the metal membrane, something which is very definitely to be preferred when the welded seam is on a vertical wall or a roof of the tank.

According to one embodiment, a protective plate is positioned above the upper edge corner of the turned-up lateral edges in order to maintain a spacing between electrodes of the welding machine when the said electrodes reach the upper edge corner at the end portion of the welded seam. Such a protective plate may have a thickness substantially equal to the total thickness of the two adjacent turned-up lateral edges and of the welding flange interposed between them.

According to one embodiment, the end portion of the welded seam is stopped below the upper edge corner of the turned-up lateral edges, then an upper portion of the turned-up lateral edges which is situated above the uppermost part of the welded seam is eliminated.

According to one embodiment, the upper portion of the turned-up lateral edges is eliminated by a local cut in the strip of sheet metal so that the uppermost part of the welded seam lies substantially at the bottom of the local cut. Such a local cut may have a rounded shape.

According to one embodiment, the upper portion of the turned-up lateral edges is eliminated along the second longitudinal portion of the strip of sheet metal.

According to one embodiment, the end portion of the welded seam is produced before a longitudinal end of the welding flange, and an upper portion of the welding flange that extends beyond the upper edge corner of the turned-up lateral edges is eliminated after the end portion of the welded seam has been produced, the upper portion of the welding flange being eliminated over a length lying between the end portion of the welded seam and the longitudinal end of the welding flange.

According to one embodiment, a respective protective plate is positioned on each side of the welding flange above the upper edge corner of the turned-up edges in order to maintain a spacing between the electrodes of the welding machine when the said electrodes reach the upper edge corner at the end portion of the welded seam. For example, each protective plate may have a thickness substantially equal to the thickness of one turned-up edge of the strip of sheet metal.

According to one embodiment, the invention thus provides a watertight and thermally insulating tank arranged inside a bearing structure comprising at least one bearing wall, the tank comprising at least one tank wall positioned along the or each bearing wall, the tank wall comprising a watertightness barrier and a thermally insulating barrier positioned between the watertightness barrier and the bearing wall, the thermally insulating barrier having a flat support surface for the watertightness barrier, the watertightness barrier having a repeated structure comprising alternately strips of sheet metal arranged on the support surface and elongate welding flanges connected to the support surface and running parallel to the strips of sheet metal over at least part of the length of the strips of sheet metal, the strips of sheet metal comprising turned-up lateral edges, arranged against the adjacent welding flanges, at least one of the said strips of sheet metal comprising:

a first longitudinal portion in which the turned-up lateral edge is watertightly welded to the welding flange by a straight welded seam parallel to the support surface, a second longitudinal portion in which the turned-up lateral edge is watertightly welded to the turned-up lateral edge of an adjacent strip of sheet metal by an edge corner weld, and an intermediate portion in which the edge corner weld of the second portion and the straight welded seam of the first portion are connected watertightly, the welded seam having an end portion which is deviated in the direction of the upper edge corner and meeting the upper edge corner of the turned-up edge in the intermediate portion of the strip of sheet metal, the edge corner weld being continued in the intermediate portion in such a way as to create a watertight joint with the end portion of the welded seam.

According to one embodiment, an upper edge corner of the turned-up lateral edge of the strip of sheet metal is straight and parallel to the support surface in the intermediate portion of the strip of sheet metal.

According to one embodiment, a nominal height of the turned-up lateral edge in the second longitudinal portion is equal to a height of the turned-up lateral edge in the first longitudinal portion.

According to another embodiment, the nominal height of the turned-up lateral edge in the second longitudinal portion is less than the height of the turned-up lateral edge in the first portion.

According to one embodiment, the turned-up lateral edge has a cut in the intermediate portion of the strip of sheet metal in order to lower the upper edge corner of the turned-up edge, the edge corner weld meeting the deviated end portion of the welded seam at the bottom of the cut.

According to one embodiment suitable for example for producing a corner structure of the tank, the tank further comprises a retaining reinforcement positioned along one edge of the bearing wall and connected to the bearing structure in order to react tensile load, the retaining reinforcement comprising a flat connecting element arranged in a border region of the wall of the tank some distance from the bearing wall in order to allow the thermally insulating barrier to pass between the flat connecting element and the bearing wall, the strip of sheet metal comprising a longitudinal end edge welded to the connecting element in the border region of the wall of the tank, the second longitudinal portion of the strip of sheet metal comprising a border portion extending between the longitudinal end edge and one end of the welding flange, the upper edge corner of the turned-up lateral edge in the border portion of the strip of sheet metal rising up progressively from the longitudinal end edge up to a nominal height of the second longitudinal portion.

According to one embodiment, the strip of sheet metal and the welding flange are made of invar.

Such a tank may form part of a shore-based storage installation, for example for storing LNG, or may be installed in a floating structure, near the coast line or in deep water, notably a methane tanker, a floating storage and regasification unit (FSRU), a floating production, storage and offloading unit (FPSO) or the like.

According to one embodiment, a ship for transporting a cold liquid product comprises a double hull and an aforementioned tank arranged in the double hull.

According to one embodiment, the invention also provides a method for loading or offloading such a ship, in which method a cold liquid product is carried through insulated pipes from or to a floating or shore-based storage installation to or from the ship's tank.

According to one embodiment, the invention also provides a system for transferring a cold liquid product, the system comprising the aforementioned ship, insulated pipes arranged in such a way as to connect the tank installed in the hull of the ship to a floating or shore-based storage installation, and a pump for driving a flow of cold liquid product through the insulated pipes from or to the floating or shore-based storage installation to or from the ship's tank.

An idea underlying the invention is to create or re-establish the watertightness of a membrane made of sheet metal with turned-up lateral edges between, on the one hand, a region where a welded seam can be created by a machine progressing parallel to the support surface of the watertightness barrier and, on the other hand, a region where a watertight welded seam is created on the edge corner of the turned-up edges. Another idea underlying the invention is to create this watertightness while at the same time maintaining the robustness and durability of the metallic membrane. Certain aspects of the invention are derived from the idea of forcing a welding machine to follow a path that it was designed to avoid.

The invention will be better understood, and other objects, details, features and advantages thereof will become clearly apparent during the course of the following description of a number of particular embodiments of the invention which are given solely by way of nonlimiting illustration and with reference to the attached drawings.

In the description below, reference is made to a watertightness barrier having a repeating structure comprising alternately strips of sheet metal arranged on the support surface and elongate welding flanges connected to the support surface and running parallel to the strips of sheet metal over at least part of the length of the strips of sheet metal, the strips of sheet metal having turned-up lateral edges positioned against the adjacent welding flanges.

Figure 1:
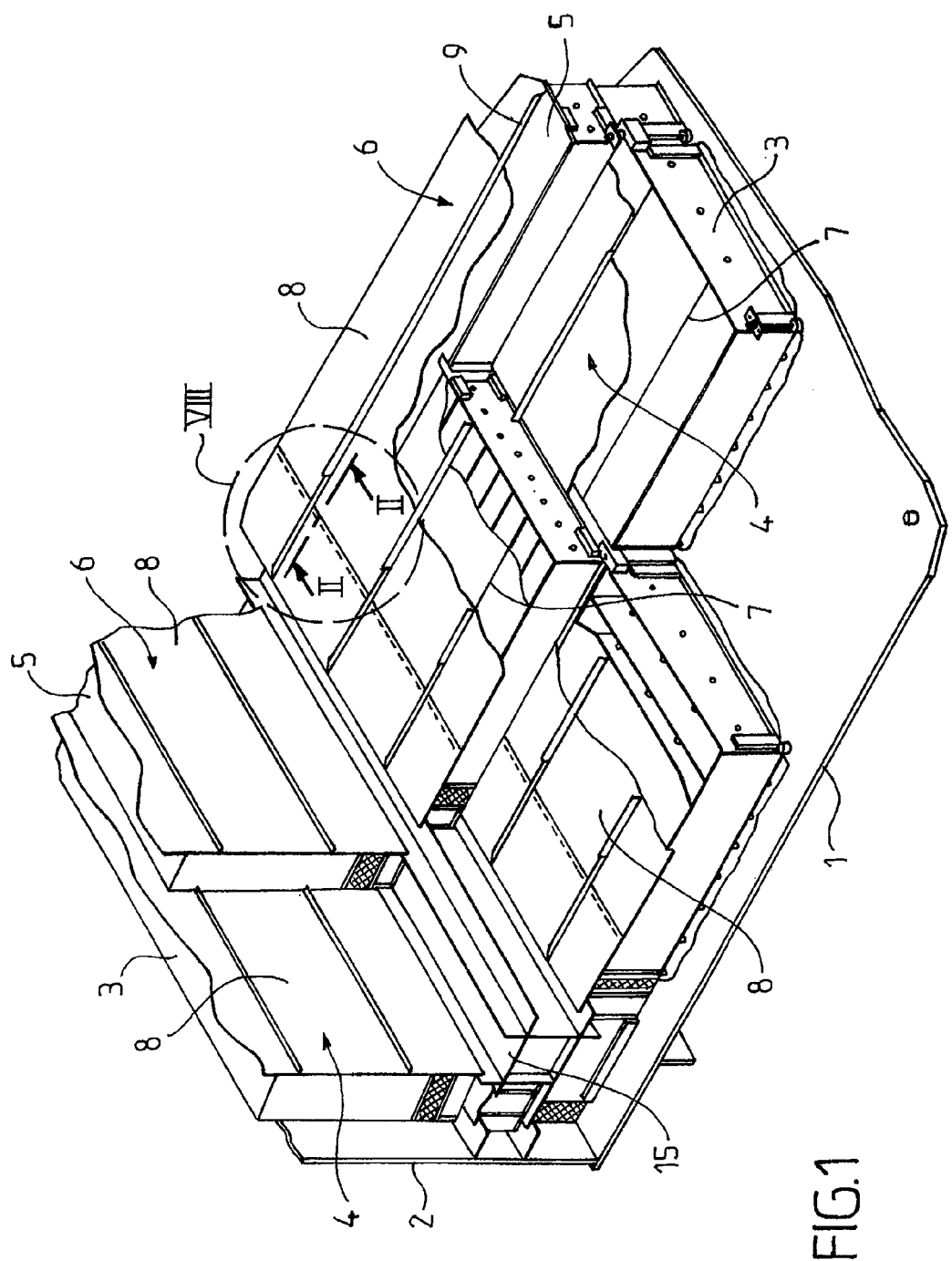
FIG. 1 is a partial perspective view of a cutaway of a wall of a watertight and thermally insulating tank in which embodiments of the invention can be used.

Such a structure is used, for example, in the tanks of methane tankers of the NO96 type marketed by the applicant. FIG. 1 is a schematic perspective view with cutaway of the watertightness and insulating walls of such a tank, at a corner between a bottom wall and a transverse wall.

The bearing structure of the tank here consists of the internal hull of a double-hull ship, the bottom wall of which has been depicted with numeral 1, and of transverse partitions 2 which define compartments in the internal hull of the ship. For each wall of the bearing structure, a corresponding wall of the tank is produced by successively superposing a secondary insulating layer 3, a secondary watertightness barrier 4, a primary insulating layer 5 and a primary watertightness barrier 6. At the corner between the two walls, the secondary watertightness barriers 4 of the two walls and the primary watertightness barriers 6 of the two walls are connected by a connecting ring 15 in the form of a square tube which is able to absorb the tension loadings resulting from thermal contraction, from deformation of the hull at sea and from movements of the cargo. One possible structure for the connecting ring 15 is described in greater detail in FR-A-2549575.

The secondary 4 and primary 6 watertightness barriers each consist of a series of parallel invar strakes with turned-up edges 8, which are arranged in alternation with elongate weld supports 9, likewise made of invar. The weld supports 9 are each held on the underlying insulating layer, for example by being housed in grooves 7 made in the cover plates of boxes filled with insulating material. This alternating structure is produced over the entire surface of the walls, and very long lengths may be involved. Over these long lengths, the watertight welded seams between the turned-up edges of the strakes and the weld supports interposed between them may be achieved in the form of straight welded seams parallel to the wall by using the welding machine described in the introduction.

In the bottom wall of the tank, the end portion of the secondary 4 and primary 6 watertightness barriers near the corner is produced differently from the central portion. This end portion 8 is better visible in FIG. 8 which depicts the primary watertightness barrier 6 by itself for simplicity.

The strakes with turned-up edges 8 are not connected directly to the connecting ring 15. A series of invar cover plates 12 is interposed between them. One cover plate 12 has an end edge 13 welded continuously to one flange of the connecting ring 15 to react tensile loads. The turned-up edges 16 of the cover plate 12 have a complex profile including an inclined portion 17 which rises up progressively from the edge 13 in the direction of the strakes 8, then a horizontal portion 18 the height of which is equal to the height of the turned-up edges 20 of the strakes 8. The cover plates 12 are butt-welded together continuously and watertightly at the upper edge corner of the turned-up edges 16. This edge corner weld can be produced manually using a TIG arc welding method employing a non-consumable electrode.

The cover plates 12 are connected to the strakes 8 at an overlap region 21 in which the opposite edge 22 of the cover plates to the edge 13 is welded continuously and watertightly to the strakes, while the turned-up edges 16 of the cover plates envelop the turned-up edge ends 20 of the strakes. The watertight welded seam at the edge corners of the cover plates 12 is continued into this region and then at the upper edge corner of the turned-up edges 20 of the strakes 8 in the direction of the weld support 9.

The weld support 9 interposed between two strakes 8 ends at the region of overlap 21 or slightly before this region. However, starting from an end point 11, the upper portion 25 of this support is leveled off so that the height of the weld support 9 is the same as the height of the turned-up edges 20, making it easier to create a watertight edge corner welded seam between them.

All along the central portion of the wall of the tank and right up to near the end region 10, the watertight connection between the turned-up edges 20 of the strakes 8 and the weld supports 9 is performed using straight welded seams 26 which extend more or less mid-way up the height of the turned-up edges 20 on each side of the weld support 9. These welded seams 26 run strictly parallel to the support surface on which the watertightness barrier rests, because the welding machine that is performing them progresses running along this surface and firmly pressed against it. However, because of a lack of space, the welding machine with electrode wheels has to be stopped short before it reaches the corner of the tank. It is therefore necessary to establish a watertight connection between the end portion of the welded seam 26 situated on the middle-of-tank side and the edge corner welded seam created at the cover plates 12 and the region of overlap 21.

To do that, one possible technique is to cut the turned-up edges 20 of the strakes 8 locally in line with the end of the welded seam 28, to lower their upper edge corner until it meets the welded seam 26. It is then possible to continue the edge corner welded seam into the bottom of this cut until a continuous joint is made with the welded seam 26. However, given that the welded seam 26 is made more or less mid-way up the height of the turned-up edges 20, this local cut constitutes a considerable region of weakness of the turned-up edges 20 of the strakes 8 likely to concentrate stresses and to break prematurely through fatigue.

Figure 2:
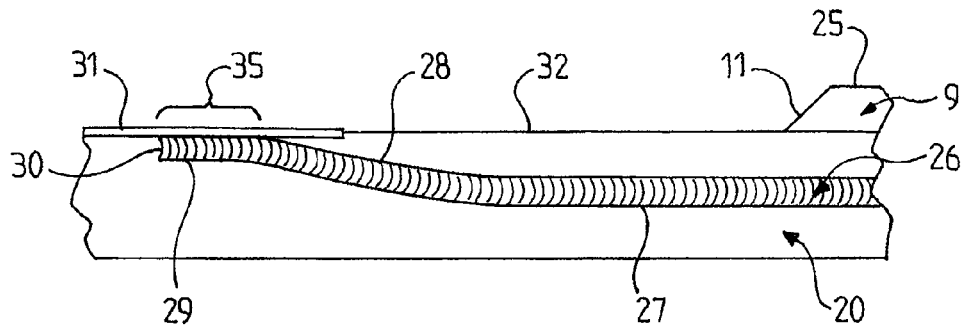
FIG. 2 is a plan view on II-II of a detail of a watertightness membrane of the tank wall of FIG. 1.

A preferred technique is depicted in FIG. 2. The same numerals are used to denote the same elements as in FIGS. 1 and 8. The end of the welded seam 26 is produced here with a straight portion 27 that continues the seam produced in the central part of the tank, followed by a deviated portion 28 which rises up with respect to the support surface unit it meets or skims the upper edge corner 32 of the turned-up edges 20, followed by a final straight portion 29 which terminates at the point 30. The edge corner welded seam 31 can then be extended from the region of overlap 21 as far as the portion 29 of the welded seam, to effect a watertight joint in the region 35.

Figure 8:
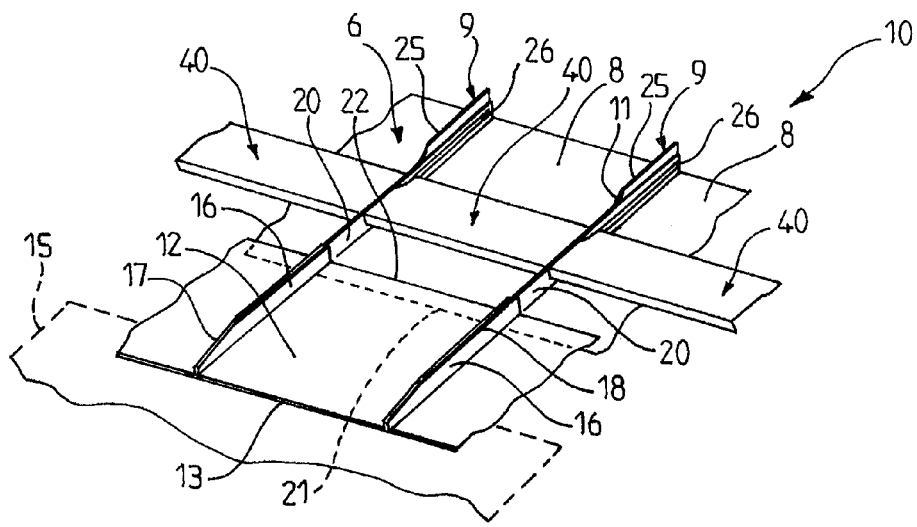
FIG. 8 is a partial perspective view of an end region of a watertightness membrane of FIG. 1.

In order to create the deviated portion 8 and the final portion 29, one possible technique is to place an inclined plane 40 on the strakes 8 on each side of the turned-up edges 20, as depicted in FIG. 8, and cause the welding machine to continue along these inclined planes. The inclined planes 40 have a profile similar to the portions 28 and 29 of the welded seam that is to be obtained.

Figure 3:
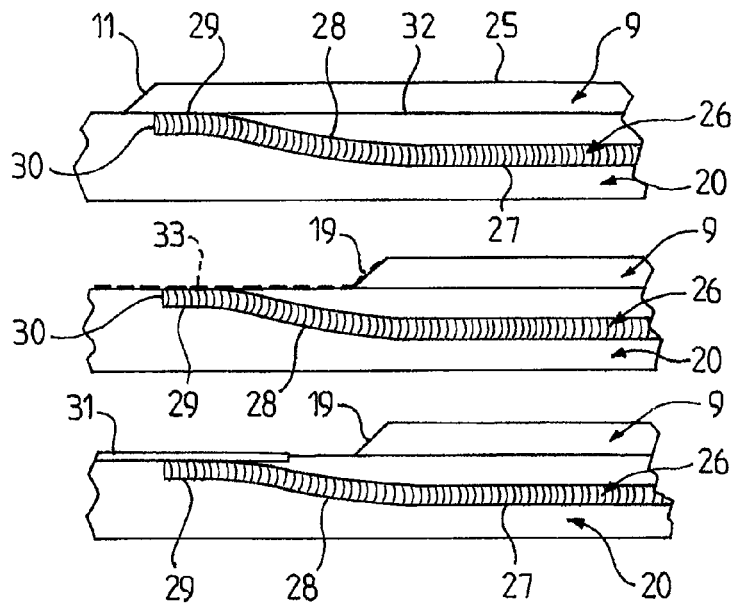
FIG. 3 depicts successive steps in a method of creating a watertightness membrane according to a first embodiment.

FIG. 3 illustrates one first embodiment of a method for the watertight joining of strakes at the end portion 10 of the watertightness barrier.

In a first step, the welded seam 26 with the portions 27, 28 and 29 is produced using the machine as described previously, in a region in which the upper portion 25 of the weld support 9 is present. The presence of the weld support 9 prevents the welding electrodes of the machine becoming short-circuited as they reach the upper edge corner 32 of the turned-up edges 20. In a second step, the upper portion 25 of the weld support is levelled off in line with the portions 28 and 29 of the welded seam as indicated by the line 33. The end point of the upper portion 25 therefore changes from the position indicated by the numeral 11 to the position indicated at 19. In a third step, the edge corner welded seam 31 is continued until it meets the final portion 29 of the welded seam.

Figure 4:
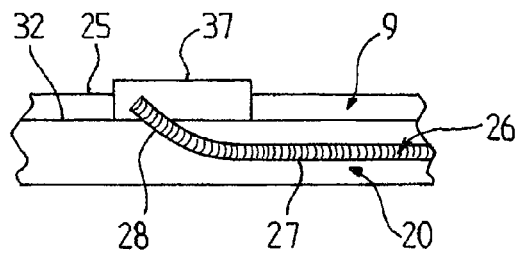
FIGS. 4 and 5 are variants of the method of FIG. 3.

FIG. 4 depicts a variant of this method, in which the first step uses two protective metal plates 37 one on each side of the weld support 9, to allow the electrode wheels a longer travel beyond the height of the weld support 9 without the risk of becoming short-circuited, as the machine disengages from the turned-up edges 20 at the end of its travel. The other steps remain unchanged. The thickness of the plate 37 may be that of a strake 8.

Figure 5:
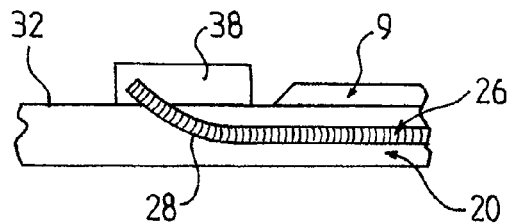

FIG. 5 depicts another variant of this method, in which the first step is performed in a region in which the weld support 9 is absent or has already been levelled off. A protective plate 38 positioned above the upper edge corner 32 of the turned-up edges 20 protects the welding electrodes from short-circuiting at the end of the creation of the deviated portion 28. The thickness of the plate 38 may be the combined thickness of the weld support 9 and of two strakes 20.

Figure 6:
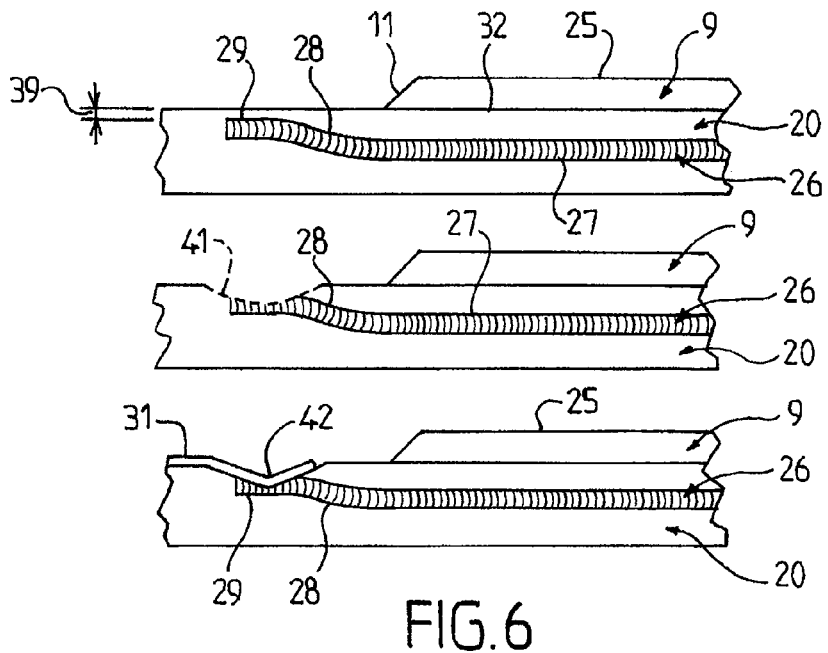
FIG. 6 depicts successive steps of a method of creating a watertightness membrane according to a second embodiment.

FIG. 6 illustrates a second embodiment of a method for the watertight joining of strakes at the end portion 10 of the watertightness barrier.

In a first step, the welded seam with the portions 27, 28 and 29 is produced by the machine as described earlier. The deviated portion 28 is created here after the end point 11 of the upper portion 25 of the weld support 9. As a variant, the deviated portion 28 could also be produced at a location where the upper portion 25 is present, as in FIG. 3, and then levelled off afterwards. The final portion 29 of the welded seam 26 is created underneath the upper edge corner 32 of the turned-up edges 20, at a separation 39 therefrom. This separation 39 ensures that the electrode wheels of the welding machine remain engaged on the turned-up edge 20 when creating the portion 29, and this prevents them from becoming short-circuited.

In a second step, a rounded cut 41 is made in the top of the weld support, to lower the upper edge corner 32 locally until it meets the final portion 29 of the welded seam 26. In a third step, the edge corner weld 31 is extended until it meets the portion 29 of the welded seam 26 at the bottom 42 of the rounded cut 41. The cut 41 is preferably of a shallow depth not exceeding one quarter of the height of the turned-up edges 20, so that it does not too significantly weaken the turned-up edges 20.

Figure 7:
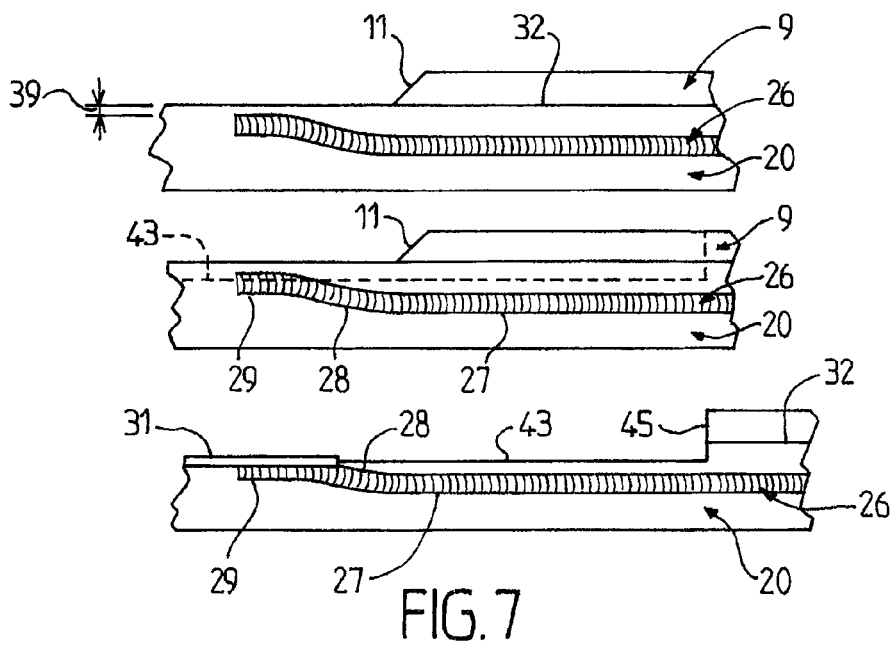
FIG. 7 depicts successive steps of a method of creating a watertightness membrane according to a third embodiment.

FIG. 7 illustrates a third embodiment of a method for the watertight joining of strakes at the end portion 10 of the watertightness barrier. The first step is the same as the one in the method of FIG. 6. In the second step, the upper part of the turned-up edges 20 is levelled off to a height slightly greater than the separation 39 so as to meet the final portion 29 of the welded seam 26, and over a length which extends from the region of overlap 21 of the strakes 8 and the cover plates 12 as far as a cutting edge 45 situated beyond the deviated portion 28 of the welded seam, as indicated by the line 43. The line 43 therefore denotes the new position of the upper edge corner of the turned-up edges 20, along which upper edge corner the edge corner welded seam 31 is produced until it watertightly meets the final portion 29 of the welded seam 26.

The methods of FIGS. 3 and 7 notably make it possible to achieve the watertight joint between the edge corner welded seam 31 and the welded seam 26 in a flat region of the turned-up edges 20, the geometry of which is not likely to cause stresses to concentrate.

These methods can be used to create the primary and/or secondary watertightness membranes at the corners of the tank, but can also be used for making repairs. Repairs entailing the watertight manual joining of an edge corner weld with a welded seam performed by the machine can also be carried out at various locations in the tank, notably in the central part of the bottom wall. One example of such a repair will now be described with reference to FIG. 9.

Figure 9:
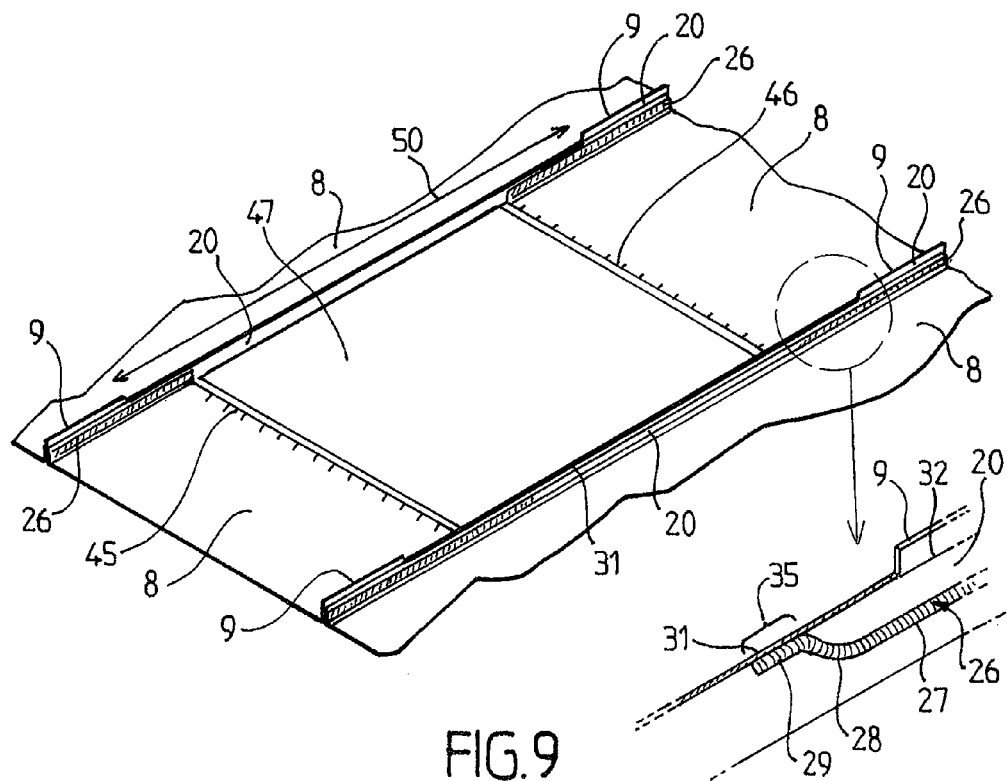
FIG. 9 is a partial perspective view of a central region of a watertightness membrane.

FIG. 9 depicts a portion of the primary membrane 6 of the tank of FIG. 1 in a central region of the bottom wall. The same reference numerals denote the same elements. It is assumed that the strake 8 in the middle of the figure has been damaged in a localized region. In order to repair the membrane in this region there are a number of operations that have to be carried out:

the levelling off of the upper portion of the weld supports 9 and of the turned-up edges 20 on a repair region 50, for example measuring of the order of 50 cm. The repair region 50 encompasses the part of the strake that has to be repaired and extends further on each side thereof the cutting of the strake 8 along the two transverse lines and two longitudinal lines which are situated at the bend of the turned-up edges, so as to remove the damaged portion, the placement of a new portion of strake 47 of a size greater than that of the removed portion in order to obtain a longitudinal overlap with the strakes that have remained in position at the ends 45 and 46, the watertight welding of the new portion of strake 47 to the strakes that have remained in position at the ends 45 and 46, the placement of the turned-up edges 20 of the new portion of strake 47 against the weld supports 9 and the creation of a watertight welded seam 31 along their upper edge corner along the entire length of the repair region 50, and the creation of a watertight connection between the edge corner welds 31 and the welded seam 26 of the strakes 8 that have remained in position. To do that, as shown in the enlarged detail of FIG. 9, the welding machine can be run again along the existing seam 26 and its path can be offset, for example using an inclined plane in order to create a deviated portion 28 which meets the edge corner weld 31. For preference, a final portion 29 of the welded seam is made substantially parallel to the upper edge corner 32 of the turned-up edges 20 in order to create a considerable region of overlap 35 with the edge corner weld 31.

In an embodiment variant, instead of using the inclined planes 40, the deviated portion 28 of the welded seam 26 is created by sharply deviating the course of the welding machine, for example by applying a jolt, so as to cause the machine to come off the top of the turned-up edges 20.

The terms "top", "bottom", "upper" and "lower" have been used hereinabove to describe a membrane situated on the bottom wall of the tank. However membranes may be created or repaired in a similar way on the other walls of the tank, notably on the side walls and the roof. The terms "top", "bottom", "upper" and "lower" have therefore to be understood with reference to the position of the wall rather than necessarily with reference to the earth's gravitational field.

The techniques described hereinabove for creating a watertightness membrane can be used in various types of reservoir for example to form the primary watertightness membrane and/or the secondary watertightness membrane of an LNG reservoir in a shore-based installation or in a floating device such as a methane tanker or the like.

Figure 10:
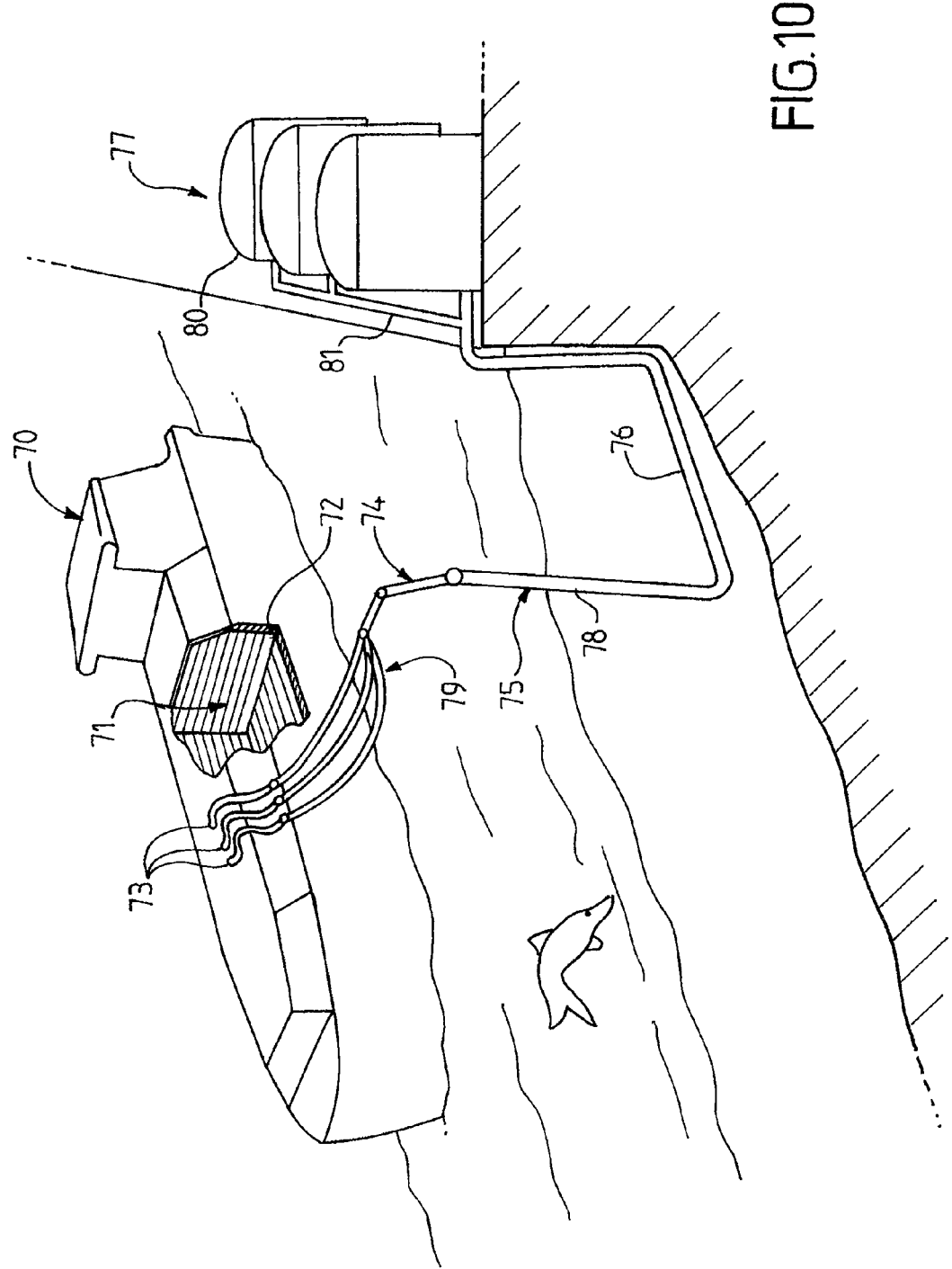
FIG. 10 is a schematic depiction with cutaway of a watertight and thermally insulating tank of a methane tanker and of a terminal for loading/offloading this tank.

FIG. 10 shows a view, with cutaway, of a methane tanker 70 with a watertight and insulated tank 71 of prismatic overall shape mounted in the double hull 72 of the ship. The wall of the tank 71 comprises a primary watertightness barrier intended to be in contact with the LNG contained in the tank, a secondary watertightness barrier arranged between the primary watertightness barrier and the double hull 72 of the ship, and two insulating barriers arranged respectively between the primary watertightness barrier and the secondary watertightness barrier and between the secondary watertightness barrier and the double hull 72.

In a way known per se, loading/offloading pipes 73 arranged on the upper deck of the ship can be connected, using suitable connectors, to a marine or harbour terminal to transfer a cargo of LNG from or to the tank 71.

FIG. 10 depicts one example of a marine terminal comprising a loading and offloading station 75, an underwater pipe 76 and a shore-based installation 77. The loading and offloading station 75 is a fixed off-shore installation comprising a mobile arm 74 and a tower 78 supporting the mobile arm 74. The mobile arm 74 carries a cluster of insulated flexible hoses 79 that can be connected to the loading/offloading pipes 73. The orientable moving arm 74 can adapt to suit all sizes of methane tankers. A connecting pipe, not depicted, extends up inside the tower 78. The loading and offloading station 75 allows the methane tanker 70 to be loaded and offloaded from or to the shore-based installation 77. The latter comprises liquefied gas storage tanks 80 and connecting pipes 81 connected by the underwater pipe 76 to the loading or offloading station 75. The underwater pipe 76 allows the liquefied gas to be transferred between the loading or offloading station 75 and the shore-based installation 77 over a long distance, for example 5 km, which means that the methane tanker 70 can be kept a long distance away from the shore line during loading and offloading operations.

In order to generate the pressure necessary to transfer the liquefied gas, use is made of pumps onboard the ship 70 and/or of the pumps with which the shore-based installation 77 is equipped and/or of the pumps with which the loading and offloading station 75 is equipped.

Although the invention has been described in conjunction with a number of specific embodiments it is quite obvious that it is not in any way restricted thereto and that it encompasses all technical equivalents of the means described and combinations thereof where these fall within the scope of the invention.

The use of the verbs "comprise", "involve" or "include" and of its conjugated forms does not exclude the presence of other elements or other steps than those listed in a claim. The use of the indefinite articles "an", "a" or "one" when describing an element or a step does not, unless mentioned otherwise exclude there being a plurality of such elements or steps.

In the claims, any reference sign placed between parentheses must not be interpreted as limiting the claim.

The invention claimed is:

1. A method of creating a watertightness barrier for a wall of a watertight and thermally insulating tank, comprising: arranging, on a thermally insulating barrier that has a flat support surface for the watertightness barrier, a repeating structure comprising alternately strips of sheet metal and elongate welding flanges connected to the support surface and projecting with respect to the latter so that the welding flanges run parallel to the strips of sheet metal over at least part of the length of the strips of sheet metal and so that lateral edges of the strips of sheet metal which are turned up with respect to the support surface are positioned against the adjacent welding flanges, for respectively a first and a second adjacent strip of sheet metal arranged on either side of a welding flange, watertightly welding the turned-up lateral edge of the strip of sheet metal to the welding flange using a straight welded seam parallel to the support surface along a first longitudinal portion of the strip of sheet metal, the straight welded seam being each time arranged beneath an upper ridge of the turned-up lateral edge of the respective strip of sheet metal, characterized by the steps of: continuing each time the straight welded seam with an end portion of the welded seam which is deviated with respect to the support surface in the direction of the upper edge corner of the turned-up lateral edge and which meets the upper edge corner of the turned-up lateral edge, and producing a watertight edge corner welded seam between the upper edge corner of the turned-up lateral edge of the first strip of sheet metal and the upper edge corner of the turned-up lateral edge of the second adjacent strip of sheet metal along a second longitudinal portion of the two strips of sheet metal so that the edge corner welded seam watertightly meets the end portion of the respective welded seam of each of the two strips of sheet metal.

2. The method according to claim 1, in which the straight welded seam is produced using a welding machine moving along resting on the two adjacent strips of sheet metal along the turned-up lateral edges, the welding machine having rotary electrode wheels and drive rolls capable of gripping the turned-up lateral edges, the drive rolls having their axes inclined towards the front of the machine in its direction of travel with respect to the direction perpendicular to the strips of sheet metal.

3. The method according to claim 2, in which the end portion of the welded seam is produced by deviating the path of the welding machine in the direction of the upper edge corner of the turned-up lateral edges.

4. The method according to claim 3, in which the welding machine is run along an inclined plane positioned on the strips of sheet metal in order to deviate its path in the direction of the upper edge corner of the turned-up lateral edges.

5. The method according to claim 2, in which a protective plate is positioned above the upper edge corner of the turned-up lateral edges in order to maintain a spacing between electrodes of the welding machine when the said electrodes reach the upper edge corner at the end portion of the welded seam.

6. The method according to claim 1, in which the end portion of the welded seam is stopped below the upper edge corner of the turned-up lateral edges, then an upper portion of the turned-up lateral edges which is situated above the uppermost part of the welded seam is eliminated.

7. The method according to claim 6, in which the upper portion of the turned-up lateral edges is eliminated by a local cut in the strip of sheet metal so that the uppermost part of the welded seam lies substantially at the bottom of the local cut.

8. The method according to claim 1, in which the end portion of the welded seam is produced before a longitudinal end of the welding flange, and in which an upper portion of the welding flange that extends beyond the upper edge corner of the turned-up lateral edges is eliminated after the end portion of the welded seam has been produced, the upper portion of the welding flange being eliminated over a length lying between the end portion of the welded seam and the longitudinal end of the welding flange.

9. A watertight and thermally insulating tank arranged inside a bearing structure comprising a bearing wall, the tank comprising a tank wall positioned along the bearing wall, the tank wall comprising a watertightness barrier and a thermally insulating barrier positioned between the watertightness barrier and the bearing wall, the thermally insulating barrier having a flat support surface for the watertightness barrier, the watertightness barrier having a repeated structure comprising alternately strips of sheet metal arranged on the support surface and elongate welding flanges connected to the support surface, projecting with respect to the latter and running parallel to the strips of sheet metal over at least part of the length of the strips of sheet metal, the strips of sheet metal comprising lateral edges which are turned up with respect to the support surface, arranged against the adjacent welding flanges, each of the two strips of sheet metal arranged on either side of a welding flange comprising a first longitudinal portion in which the turned-up lateral edge of the respective strip of sheet metal is watertightly welded to the welding flange by a straight welded seam parallel to the support surface, the straight welded seam being each time arranged beneath an upper ridge of the turned-up lateral edge of the respective strip of sheet metal, characterized in that each of the two strips of sheet metal arranged in either side of a welding flange furthermore comprises:

a second longitudinal portion in which the turned-up lateral edge is watertightly welded to the turned-up lateral edge of the other adjacent strip of sheet metal by an edge corner weld, and an intermediate portion in which the edge corner weld of the second portion and the straight welded seam of the first portion are connected watertightly, the welded seam each time having an end portion which is deviated with respect to the support surface in the direction of the upper edge corner and meeting the upper edge corner of the turned-up edge in the intermediate portion of the respective strip of sheet metal, the edge corner weld being continued in the intermediate portion of each of the two strips of sheet metal in such a way as to create a watertight joint with the end portion of the respective welded seam of each of the two strips of sheet metal.

10. The tank according to claim 9, in which the upper edge corner of the turned-up lateral edge of the strip of sheet metal is straight and parallel to the support surface in the intermediate portion of the strip of sheet metal.

11. The tank according to claim 9, in which a nominal height of the turned-up lateral edge in the second longitudinal portion is equal to a height of the turned-up lateral edge in the first longitudinal portion.

12. The tank according to claim 9, in which the nominal height of the turned-up lateral edge in the second longitudinal portion is less than the height of the turned-up lateral edge in the first portion.

13. The tank according to claim 9, in which the turned-up lateral edge has a cut in the intermediate portion of the strip of sheet metal in order to lower the upper edge corner of the turned-up edge, the edge corner weld meeting the deviated end portion of the welded seam at the bottom of the cut.

14. The tank according to claim 9, in which the tank further comprises a retaining reinforcement positioned along one edge of the bearing wall and connected to the bearing structure in order to react tensile load, the retaining reinforcement comprising a flat connecting element arranged in a border region of the wall of the tank some distance from the bearing wall in order to allow the thermally insulating barrier to pass between the flat connecting element and the bearing wall, the strip of sheet metal comprising a longitudinal end edge welded to the connecting element in the border region of the wall of the tank, the second longitudinal portion of the strip of sheet metal comprising a border portion extending between the longitudinal end edge and one end of the welding flange, the upper edge corner of the turned-up lateral edge in the border portion of the strip of sheet metal rising up progressively from the longitudinal end edge up to a nominal height of the second longitudinal portion.

15. A ship for transporting a cold liquid product, the ship having a double hull and a tank according to claim 9 arranged in the double hull.

16. The use of a ship according to claim 15, in which use a cold liquid product is carried through insulated pipes from or to a floating or shore-based storage installation to or from the ship's tank in order to load or offload the strip.

17. A system for transferring a cold liquid product, the system comprising a ship according to claim 15, insulated pipes arranged in such a way as to connect the tank installed in the hull of the ship to a floating or shore-based storage installation, and a pump for driving a flow of cold liquid product through the insulated pipes from or to the floating or shore-based storage installation to or from the ship's tank.

18. The method according to claim 3, in which a protective plate is positioned above the upper edge corner of the turned-up lateral edges in order to maintain a spacing between electrodes of the welding machine when the said electrodes reach the upper edge corner at the end portion of the welded seam.

19. The method according to claim 4, in which a protective plate is positioned above the upper edge corner of the turned-up lateral edges in order to maintain a spacing between electrodes of the welding machine when the said electrodes reach the upper edge corner at the end portion of the welded seam.

20. The method according to claim 2, in which the end portion of the welded seam is stopped below the upper edge corner of the turned-up lateral edges, then an upper portion of the turned-up lateral edges which is situated above the uppermost part of the welded seam is eliminated.

* * * * *